United States Patent
Morikaku et al.

(10) Patent No.: US 6,806,616 B2
(45) Date of Patent: Oct. 19, 2004

(54) ROTOR OF ROTATING ELECTRIC MACHINE

(75) Inventors: Hideki Morikaku, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/693,931

(22) Filed: Oct. 28, 2003

(65) Prior Publication Data

US 2004/0135464 A1 Jul. 15, 2004

(30) Foreign Application Priority Data

Nov. 1, 2002 (JP) ........................................ 2002-319198

(51) Int. Cl.[7] ............................ H02K 12/21; H02K 5/00
(52) U.S. Cl. ........................................ 310/263; 310/91
(58) Field of Search ............... 310/263, 91; 29/596–598

(56) References Cited

U.S. PATENT DOCUMENTS

| | | | | |
|---|---|---|---|---|
| 5,578,885 A | * | 11/1996 | Alford et al. | 310/263 |
| 5,828,155 A | * | 10/1998 | Adachi et al. | 310/263 |
| 5,903,084 A | | 5/1999 | Asao et al. | |
| 6,011,343 A | * | 1/2000 | Taniguchi | 310/263 |
| 6,201,335 B1 | * | 3/2001 | Higashino et al. | 310/263 |
| 6,333,582 B1 | * | 12/2001 | Asao et al. | 310/263 |
| 6,369,485 B1 | * | 4/2002 | Oohashi et al. | 310/263 |

FOREIGN PATENT DOCUMENTS

| | | |
|---|---|---|
| JP | 11-136913 A | 5/1999 |
| JP | 2001-86715 A | 3/2001 |

* cited by examiner

*Primary Examiner*—Tran Nguyen
(74) *Attorney, Agent, or Firm*—Sughrue Mion, PLLC (57) ABSTRACT

Pole core members of a rotor are fitted on a rotary shaft with claw-shaped magnetic poles engaged with one another from front and rear sides. Each of magnet mounting members for holding magnets against side surfaces of each magnetic pole has magnet retaining portions on both sides and a platelike middle portion. Located between two adjacent claw-shaped magnetic poles, each magnet produces a magnetic field oriented in a direction opposite to the direction of a magnetic flux formed between the adjacent claw-shaped magnetic poles. The claw-shaped magnetic pole has a stopper portion at its extreme end on an inclined inside surface. The magnet mounting member carrying the magnets in the magnet retaining portions is mounted on each claw-shaped magnetic pole with the middle portion of the magnet mounting member situated against the inclined inside surface of the magnetic pole, and a backup ring is fitted inside the magnet mounting members.

7 Claims, 5 Drawing Sheets

ROTOR OF ROTATING ELECTRIC MACHINE

BACKGROUND OF THE INVENTION

1. Field of the Invention

The present invention relates generally to a rotor of a rotating electric machine and, more particularly, to a rotor of an alternating current (AC) generator or motor in which the rotor includes a pair of pole core members having a plurality of claw-shaped magnetic poles extending along an axial direction of the rotor at regular intervals around the rotor, wherein the claw-shaped magnetic poles are directed face to face from the individual pole core members and engaged with one another as if surrounding a rotor coil.

2. Description of the Background Art

A construction of a rotor of a conventional rotating electric machine is shown in Japanese Laid-open Patent Publication No. 2001-86715, for instance. According to the Publication, the rotor includes a rotor coil and a pair of pole core members having a plurality of claw-shaped magnetic poles extending like claws along an axial direction of the rotor at regular intervals around the rotor. The rotor is constructed by fitting the pole core members on a rotary shaft with the claw-shaped magnetic poles of the two pole core members directed face to face from front and rear sides and engaged with one another so that the claw-shaped magnetic poles surround the rotor coil, wherein a magnet which produces a magnetic field oriented in a direction opposite to the direction of a magnetic flux formed between two adjacent claw-shaped magnetic poles is located between side surfaces of the oppositely directed two adjacent claw-shaped magnetic poles. The rotating electric machine (AC generator or motor) includes the rotor thus constructed and a stator located to surround the rotor, the stator including a stator core on which a stator coil is wound, as illustrated in the aforementioned Patent Publication.

When the pole core members are excited by the rotor coil in this construction, the claw-shaped magnetic poles on one side are magnetized as north (N) poles and the oppositely directed claw-shaped magnetic poles on the other side are magnetized as south (S) poles. As the magnets which produce magnetic fields oriented in directions opposite to the directions of the magnetic fluxes formed between the adjacent claw-shaped magnetic poles are situated between the side surfaces of the oppositely directed adjacent claw-shaped magnetic poles, the number of lines of magnetic fluxes between the side surfaces of the adjacent claw-shaped magnetic poles is decreased and the number of lines of magnetic fluxes extending from outer peripheral surfaces of the claw-shaped magnetic poles toward the stator is increased.

One construction proposed in the aforementioned patent Publication No. 2001-86715 employs reinforcing members having a generally M-shaped cross section for holding magnets on both side surfaces of each claw-shaped magnetic pole. Another construction proposed in the Publication employs reinforcing members having a generally C-shaped cross section for holding magnets on both side surfaces of each claw-shaped magnetic pole. In either of these constructions, the magnets are held at fixed positions on the side surfaces of the claw-shaped magnetic poles by the reinforcing members against a centrifugal force acting on the magnets due to rotation of a rotor, because the reinforcing members are hooked on the inside of the claw-shaped magnetic poles.

As shown in the foregoing discussion, the rotor of the conventional rotating electric machine (AC generator or motor) includes a pair of pole core members having multiple claw-shaped magnetic poles extending like claws along the axial direction of the rotor at regular intervals around the rotor, in which the pole core members are fitted on the rotary shaft with the claw-shaped magnetic poles of the two pole core members directed face to face from front and rear sides and engaged with one another so that the claw-shaped magnetic poles surround the rotor coil. The magnets which produce the magnetic fields oriented in the directions opposite to the directions of the magnetic fluxes formed between the two adjacent claw-shaped magnetic poles are situated between the side surfaces of the adjacent claw-shaped magnetic poles with the magnets supported by the reinforcing members. In this construction, the magnets supported by the reinforcing members are separated from the side surfaces of the claw-shaped magnetic poles when the rotor is at rest. When the rotor turns, exerting a centrifugal force on the magnets, the magnets go into tight contact with the side surfaces of the claw-shaped magnetic poles. The magnets supported by the reinforcing members are caused to go into contact with and come apart from the side surfaces of the claw-shaped magnetic poles with rotary motion of the rotor in this fashion.

In the rotor of the conventional rotating electric machine thus constructed, each of the claw-shaped magnetic poles is narrowed and thinned toward an extreme end, forming an inclined surface on its inside. This construction of the prior art has a problem that the centrifugal force acting on the magnets and vibrations occurring as a result of rotation of the rotor could cause the reinforcing members holding the magnets to shift toward the extreme ends of the claw-shaped magnetic poles, creating a gap between the magnets and the side surfaces of the claw-shaped magnetic poles and consequently causing the magnets to deviate from their normal positions.

SUMMARY OF THE INVENTION

This invention has been made to provide a solution to the aforementioned problem of the prior art. Specifically, it is an object of the invention to provide a rotor of a rotating electric machine in which magnets located between side surfaces of adjacent claw-shaped magnetic poles of a pair of pole core members are held stationary on the side surfaces of the claw-shaped magnetic poles regardless of changes in rotating speed of the rotor or recurring cycles of its rotary motion and stoppage.

According to the present invention, a rotor of a rotating electric machine includes a rotary shaft, a rotor coil surrounding the rotary shaft, a pair of pole core members having a plurality of claw-shaped magnetic poles extending like claws along an axial direction of the rotor at regular intervals around the rotor, each claw-shaped magnetic pole becoming thinner toward its extreme end forming an inclined inside surface facing the rotary shaft and the pole core members being fitted on the rotary shaft with their claw-shaped magnetic poles directed face to face from front and rear sides and engaged with one another so that the claw-shaped magnetic poles surround the rotor coil, a plurality of magnets located on both sides of each claw-shaped magnetic pole such that each of the magnets produces a magnetic field oriented in a direction opposite to the direction of a magnetic flux formed between the adjacent claw-shaped magnetic poles, a plurality of magnet mounting members for holding the magnets against both side surfaces of each claw-shaped magnetic pole, and a backup ring having an outer peripheral surface for securing the magnet mounting members in position.

Having a generally C-shaped cross section, each of the magnet mounting members includes magnet retaining portions formed on both sides for holding the magnets against the side surfaces of each claw-shaped magnetic pole, and a middle portion having a flat platelike shape which matches the inclined inside surface of each claw-shaped magnetic pole, each of the magnet mounting members and the magnets fitted in the magnet retaining portions on both sides together forming a magnet assembly. The claw-shaped magnetic poles of the pole core members each have a stopper portion at the extreme end on the inclined inside surface, and the magnet assembly is fixedly mounted on each claw-shaped magnetic pole with the middle portion of the magnet mounting member placed against the inclined inside surface of each claw-shaped magnetic pole and engaged with its stopper portion.

The outer peripheral surface of the backup ring is so shaped as to align with alternately oppositely inclined inside surfaces of the magnet mounting members of the magnet assemblies mounted on the claw-shaped magnetic poles at their basal parts, and the backup ring is fitted inside the magnet assemblies mounted on the claw-shaped magnetic poles such that the backup ring aligns with the inclined inside surfaces of the magnet mounting members.

In this construction, the magnet assembly and the magnets fitted therein are prevented from being displaced toward the extreme end of each claw-shaped magnetic pole due to a centrifugal force acting on the magnets of the magnet assembly as a result of rotation of the rotary shaft, and the individual magnet assemblies are held tight against the claw-shaped magnetic poles by the backup ring. This construction makes it possible to produce a rotor of a rotating electric machine in which neither the magnet assemblies nor the magnets fitted therein come off or deviate from their normal positions.

These and other objects, features and advantages of the invention will become more apparent upon reading the following detailed description in conjunction with the accompanying drawings.

DESCRIPTION OF THE PREFERRED EMBODIMENTS

First Embodiment

Figure 1:
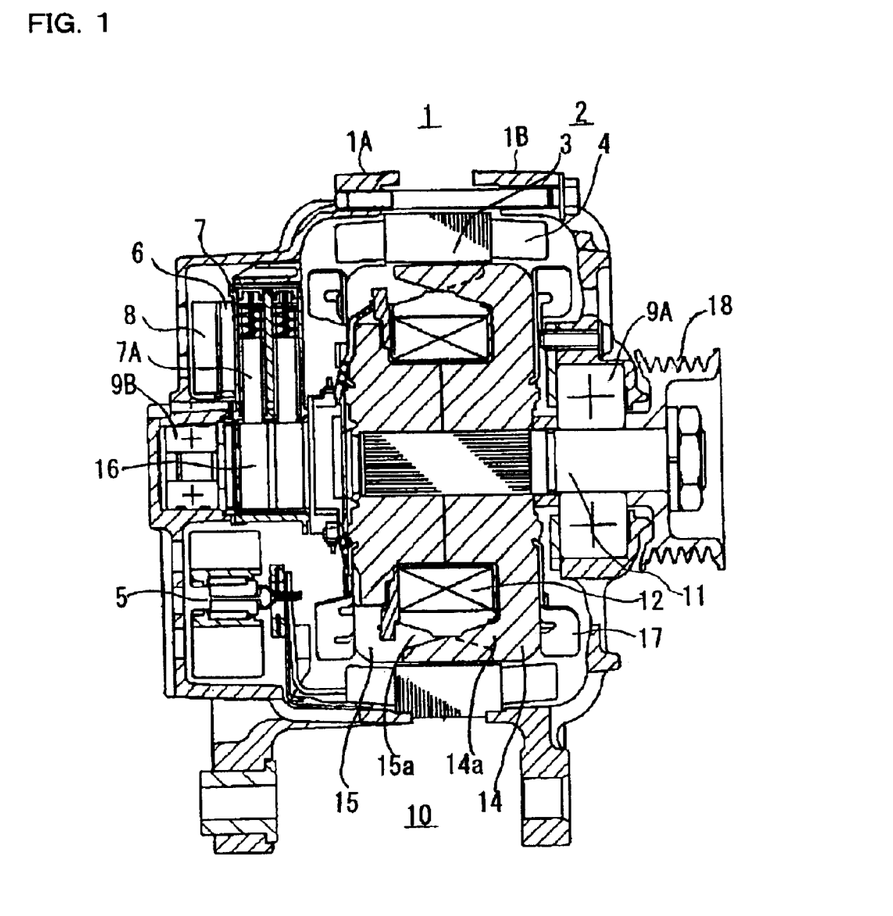
FIG. 1 is a sectional view showing the construction of a rotating electric machine according to a first embodiment of the invention.
Figure 2:
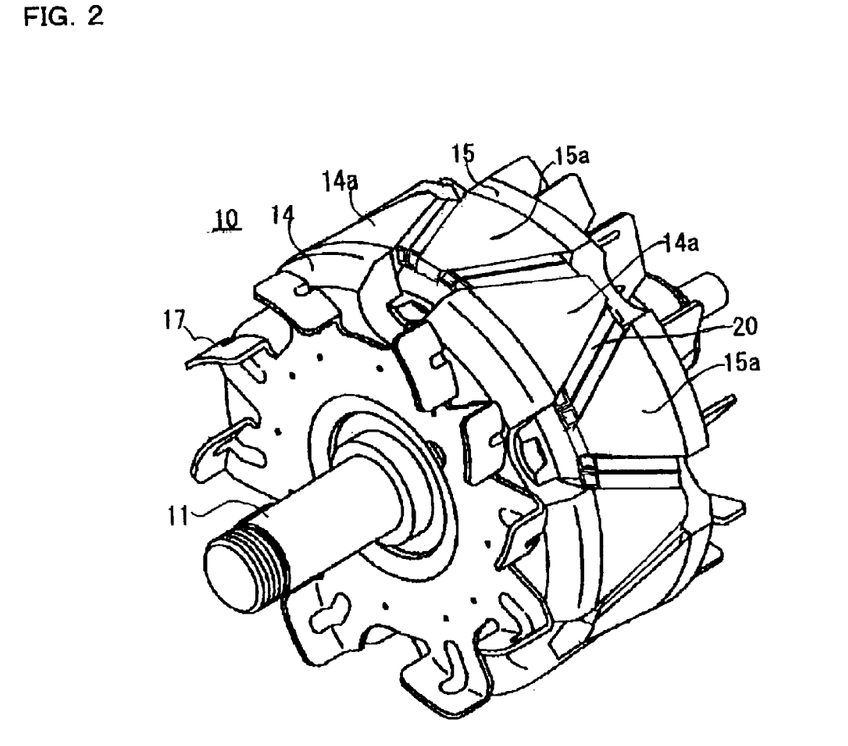
FIG. 2 is a perspective view showing the construction of a rotor of the rotating electric machine of FIG. 1.

FIG. 1 is a sectional view of a rotating electric machine, such as a generator or a motor, according to a first embodiment of the present invention, and FIG. 2 is a perspective view of a rotor 10 of the rotating electric machine.

The rotating electric machine includes a casing 1 including a front bracket 1A and a rear bracket 1B, both made of aluminum, a stator 2 including a stator core 3 affixed to an inside wall of the casing 1 and a stator coil 4, a rectifier 5 connected to the stator coil 4 for converting an AC voltage induced in the stator coil 4 into a direct current (DC) voltage, a regulator 6 for regulating the AC voltage produced by the stator coil 4, a brush holder 7 holding brushes 7A through which exciting currents are supplied to the rotor 10 and a heat sink 8 fitted to the brush holder 7.

The rotor 10 includes a rotary shaft 11, a rotor coil 12 surrounding the rotary shaft 11, and a pair of front and rear pole core members 14, 15, the front pole core member 14 having multiple claw-shaped magnetic poles 14a extending like claws along an axial direction of the rotor 10 at regular intervals around the rotor 10 and the rear pole core member 15 having multiple claw-shaped magnetic poles 15a extending like claws along the axial direction of the rotor 10 at regular intervals around the rotor 10. The front and rear pole core members 14, 15 are fitted on the rotary shaft 11 with the claw-shaped magnetic poles 14a, 15a of the front and rear pole core members 14, 15 directed face to face from front and rear sides and engaged with one another so that the claw-shaped magnetic poles 14a, 15a surround the rotor coil 12.

Figure 3:
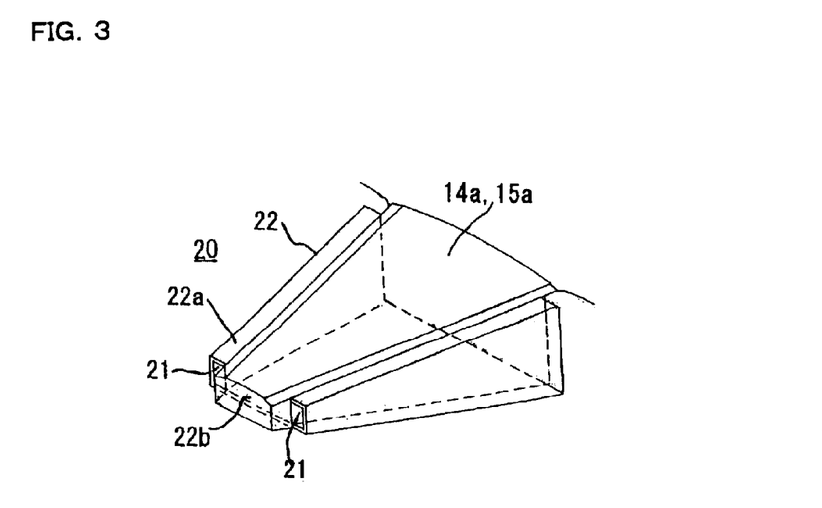
FIG. 3 is a perspective view of a portion including a claw-shaped magnetic pole of the rotor of FIG. 2.

Referring to FIG. 3, mounted on both sides of each of the claw-shaped magnetic poles 14a, 15a is a pair of magnets 21 which produce magnetic fields oriented in directions opposite to the directions of magnetic fluxes formed between the adjacent claw-shaped magnetic poles 14a, 15a. These magnets 21 are fitted in magnet retaining portions 22a of a magnet mounting member 22, together forming a magnet assembly 20.

Slip rings 16 through which the exciting currents are supplied to the rotor coil 12 are fitted on the rotary shaft 11. Also, fans 17 are fitted on the rotary shaft 11 close to its both ends, on the outside of the front and rear pole core members 14, 15. The rotor 10 is supported by the front bracket 1A and the rear bracket 1B rotatably about the rotary shaft 11 via bearings 9A and 9B which are mounted on front and rear portions of the rotary shaft 11, respectively. Further, a pulley 18 is mounted on one end of the rotary shaft 11.

When excited by the rotor coil 12, the claw-shaped magnetic poles 14a, 15a of the front and rear pole core members 14, 15 are magnetized, the claw-shaped magnetic poles 14a of the pole core member 14 producing N poles and the claw-shaped magnetic poles 15a of the pole core member 15 producing S poles, for instance. The magnets 21 are placed between the adjacent claw-shaped magnetic poles 14a, 15a of the front and pole core members 14, 15 for producing the magnetic fields oriented in the directions opposite to the directions of the magnetic fluxes formed between the adjacent claw-shaped magnetic poles 14a, 15a which are magnetized to thereby increase the number of lines of magnetic fluxes distributed along a circumferential direction of the rotor 10. Accordingly, the magnets 21 are arranged in such a manner that N poles of the magnets 21 face side surfaces of the claw-shaped magnetic poles 14a producing the N poles, and S poles of the magnets 21 face side surfaces of the claw-shaped magnetic poles 15a producing the S poles. Since the magnets 21 for producing the magnetic fields oriented in the directions opposite to the directions of the magnetic fluxes formed between the adjacent claw-shaped magnetic poles 14a, 15a are placed between the side surfaces of the claw-shaped magnetic poles 14a, 15a in this fashion, magnetic fluxes produced by the magnetized claw-shaped magnetic poles 14a, 15a spread toward the stator 2 so that the number of lines of the magnetic fluxes formed between the side surfaces of the adjacent claw-shaped magnetic poles 14a, 15a is decreased and the number of lines of the magnetic fluxes intersecting the stator 2 is increased.

Described below is how the magnets 21 are mounted against the side surfaces of each of the claw-shaped magnetic poles 14a, 15a.

Figure 4:
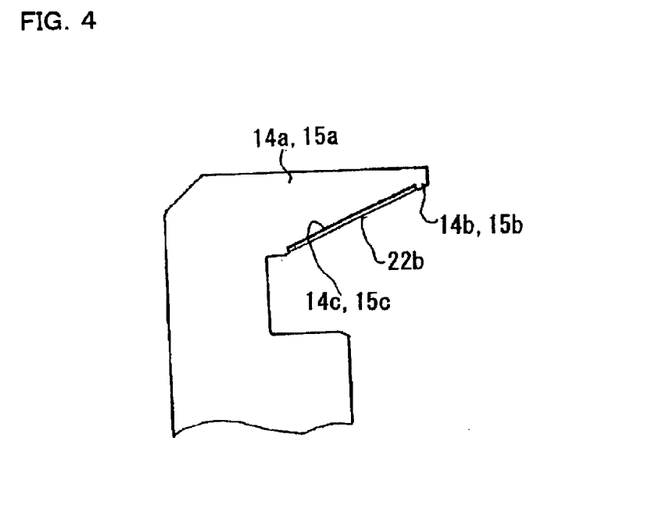
FIG. 4 is a sectional side view of the claw-shaped magnetic pole of FIG. 3.
Figure 5A:
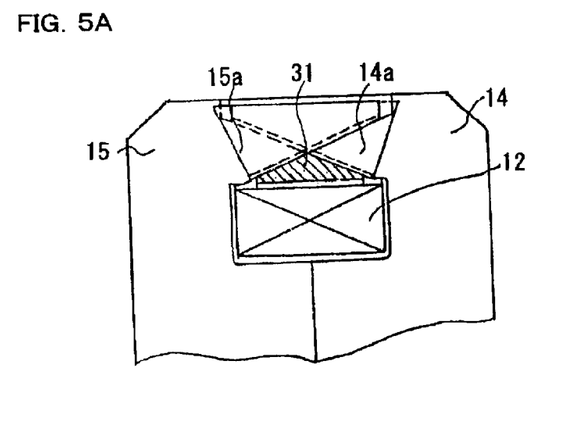
FIG. 5A is a sectional view showing how a backup ring having an outwardly projecting V-shaped cross section is fitted on the inside of inclined surfaces of magnet mounting members of individual magnet assemblies according to the first embodiment.
Figure 5B:
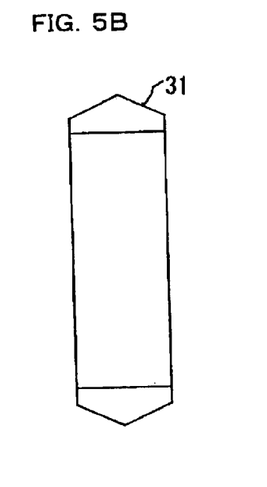
FIG. 5B is a side view of the backup ring of the first embodiment.

FIG. 3 is a perspective view of a portion including the claw-shaped magnetic pole 14a of the pole core member 14 or the claw-shaped magnetic pole 15a of the pole core member 15, FIG. 4 is a sectional side view of each of the claw-shaped magnetic poles 14a, 15a taken along a longitudinal direction thereof, FIG. 5A is a sectional view showing how a backup ring 31 is fitted inside the magnet mounting members 22 of the magnet assembles 20, and FIG. 5B is a side view of the backup ring 31.

Each of the claw-shaped magnetic poles 14a, 15a becomes thinner toward their extreme end, forming an inclined inside surface as illustrated. This inclined inside surface of each claw-shaped magnetic pole 14a, 15a facing the rotary shaft 11 has a "stepped-down" stage forming a shallow groovelike crosswise recess 14c, 15c. Each recess 14c, 15c is bounded by a stopper portion 14b, 15b protruding toward the rotary shaft 11 along the extreme end of the magnetic pole 14a, 15a so that the magnet mounting member 22 fits in each recess 14c, 15c as illustrated in FIG. 4. Each magnet 21 is a flat platelike magnet piece having a generally platelike trapezoidal shape in side view to match the shape of the claw-shaped magnetic pole 14a, 15a.

Each magnet mounting member 22 fitted with two magnets 21 in the magnet retaining portions 22a on both sides is mounted on the claw-shaped magnetic pole 14a, 15a on its side (inclined inside surface) facing the rotary shaft 11 so that the magnets 21 are positioned against the side surfaces of the claw-shaped magnetic pole 14a, 15a. The magnet retaining portions 22a of the magnet mounting member 22 are formed by bending side portions of the magnet mounting member 22 in such a manner that, with the magnets 21 positioned against the side surfaces of the claw-shaped magnetic pole 14a, 15a, the bent portions of the magnet mounting member 22 extend along an outer peripheral surface of the claw-shaped magnetic pole 14a, 15a and then parallel to its side surfaces. As a middle portion 22b of the magnet mounting member 22 joining its magnet retaining portions 22a on both sides has a flat platelike shape that matches the inclined inside surface of the claw-shaped magnetic pole 14a, 15a facing the rotary shaft 11, the magnet mounting member 22 has a generally C-shaped cross section as a whole. The magnet mounting member 22 is made of an approximately 0.5 mm thick nonmagnetic stainless steel sheet, for instance. The magnet mounting member 22 and the magnets 21 fitted in the magnet retaining portions 22a formed on both sides of the magnet mounting member 22 together constitute the aforementioned magnet assembly 20 which is mounted on each of the claw-shaped magnetic poles 14a, 15a. The magnets 21 need not necessarily be of trapezoidal form but may be shaped into rectangular form, for example.

The magnet assembly 20 thus constructed is mounted on the claw-shaped magnetic pole 14a, 15a by fitting the middle portion 22b of the magnet mounting member 22 of the magnet assembly 20 in the recess 14c, 15c formed in the inclined inside surface of the claw-shaped magnetic pole 14a, 15a. Then, the backup ring 31 having an outwardly projecting V-shaped cross section as shown in FIG. 5A is fitted inside the claw-shaped magnetic poles 14a, 15a such that curved outer surfaces of the backup ring 31 lie along inner portions of inclined inside surfaces formed by the middle portions 22b of the magnet mounting members 22 on front and rear sides, and the front and rear pole core members 14, 15 are fitted on the rotary shaft 11 so that the claw-shaped magnetic poles 14a, 15a surround the rotor coil 12 with the claw-shaped magnetic poles 14a, 15a of the front and rear pole core members 14, 15 directed face to face from front and rear sides and engaged with one another.

The backup ring 31 is fitted such that its curved outer surfaces are positioned along the inclined inside surfaces of the magnet mounting members 22 of the magnet assemblies 20 mounted on the front and rear pole core members 14, 15 as stated above. With this arrangement, each of the magnet assemblies 20 is constrained in position by edges of the recess 14c, 15c in the claw-shaped magnetic pole 14a, 15a and remains firmly affixed to the claw-shaped magnetic pole 14a, 15a, so that the magnet assembly 20 does not lift from the recess 14c, 15c in the claw-shaped magnetic pole 14a, 15a or shift toward its extreme end even when the rotor 10 rotates.

The outside diameter of the backup ring 31 should preferably be determined taking into account the amount of elastic deformation which occurs when the backup ring 31 is forced against the middle portions 22b of the magnet mounting members 22 which are arranged in a ring form having a specific diameter. In this structure, it is possible to apply an outwardly directed pushing force to the middle portions 22b of the magnet mounting members 22 by fitting the backup ring 31, whereby the magnet assemblies 20 can be more firmly affixed to the claw-shaped magnetic poles 14a, 15a.

Second Embodiment

Figure 6A:
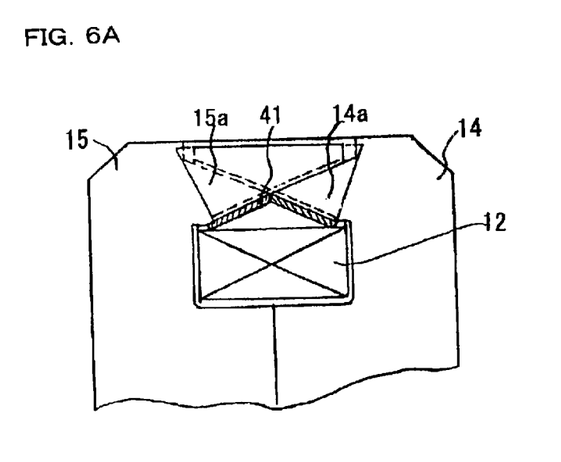
FIG. 6A is a sectional view showing how a pair of umbrella-shaped backup rings having conical outer surfaces is fitted on the inside of inclined surfaces of magnet mounting members of individual magnet assemblies according to a second embodiment of the invention.
Figure 6B:
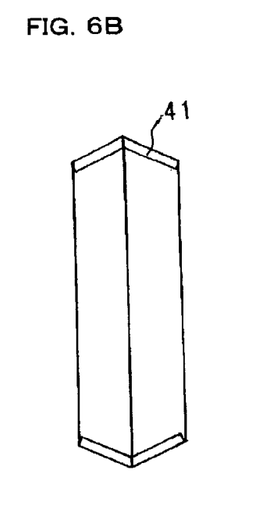
FIG. 6B is a side view of the backup rings of the second embodiment.

FIG. 6A is a sectional view of a pole core portion assembled by using a pair of backup rings 41 according to a second embodiment of the invention, and FIG. 6B is a side view of the backup rings 41, in which elements identical or similar to those of the first embodiment are designated by the same reference numerals.

The backup rings 41 of this embodiment have a truncated circular cone shape and are fitted inside the magnet mounting members 22 mounted on the claw-shaped magnetic poles 14a, 15a with large-diameter sides of the two umbrella-shaped backup rings 41 held in face-to-face contact (FIG. 6B) such that conical outer surfaces of the backup rings 41 align with the inclined inside surfaces of the magnet assemblies 20.

In this embodiment, each backup ring 41 is shaped in a truncated conical form so that its curved outer surface aligns with the inclined inside surfaces of the magnet assemblies 20. After fitting the individual magnet assemblies 20 on the claw-shaped magnetic poles 14a, 15a, each backup ring 41 thus shaped is fitted inside the claw-shaped magnetic poles 14a, 15a of each pole core member 14, 15 such that the large-diameter circumferential portion of the backup ring 41 is situated against the middle portions 22b of the magnet mounting members 22. Then, the front and rear pole core members 14, 15 are mounted on the rotary shaft 11 with the large-diameter sides of the backup rings 41 facing each other in such a manner that the front and rear pole core members 14, 15 are engaged with one another.

The outside diameter of the backup rings 41 should preferably be determined taking into account the amount of elastic deformation which occurs when the backup rings 41 are forced against the middle portions 22b of the magnet mounting members 22 which are arranged in a ring form having a specific diameter. In this structure, it is possible to apply an outwardly directed pushing force to the middle portions 22b of the magnet mounting members 22 by fitting the backup rings 41, whereby the magnet assemblies 20 can be more firmly affixed to the claw-shaped magnetic poles 14a, 15a.

Third Embodiment

Figure 7A:
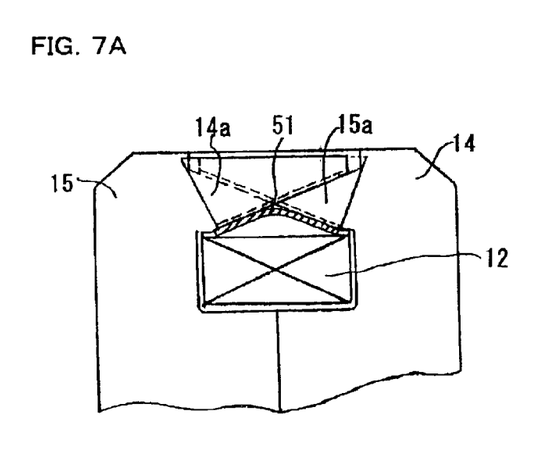
FIG. 7A is a sectional view showing how a backup ring having an outwardly projecting V-shaped cross section is fitted on the inside of inclined surfaces of magnet mounting members of individual magnet assemblies according to a third embodiment.
Figure 7B:
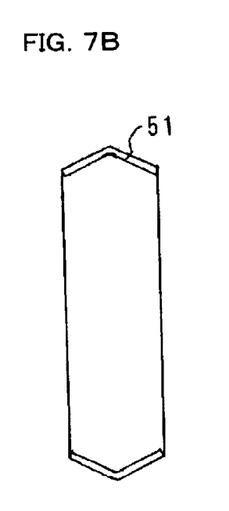
FIG. 7B is a side view of the backup ring of the third embodiment.

FIG. 7A is a sectional view of a pole core portion assembled by using a backup ring 51 according to a third embodiment of the invention, and FIG. 7B is a side view of the backup ring 51, in which elements identical or similar to those of the first embodiment are designated by the same reference numerals.

Produced by shaping a hollow cylindrical piece, the backup ring 51 of this embodiment has an outwardly projecting V-shaped cross section as illustrated. The backup ring 51 thus shaped is fitted inside the magnet mounting members 22 mounted on the claw-shaped magnetic poles 14a, 15a such that conical outer surfaces of the backup ring 51 align with the inclined inside surfaces of the magnet assemblies 20.

In this embodiment, the backup ring 51 is produced by shaping a hollow cylindrical piece in such a fashion that its curved outer surface aligns with the inclined inside surfaces of the magnet assemblies 20 alternately mounted on the claw-shaped magnetic poles 14a, 15a of the front and rear pole core members 14, 15. After fitting the individual magnet assemblies 20 on the claw-shaped magnetic poles 14a, 15a, the backup ring 51 thus shaped is fitted inside the claw-shaped magnetic poles 14a, 15a of the pole core members 14, 15 such that the conical outer surfaces of the backup ring 51 are situated against the middle portions 22b of the magnet mounting members 22. Then, the front and rear pole core members 14, 15 are mounted on the rotary shaft 11 so that the front and rear pole core members 14, 15 are engaged with one another.

The backup ring 51 of this embodiment can be produced by simply shaping a hollow cylindrical piece to form an outwardly projecting V-shaped cross section at low cost with ease of machining.

The outside diameter of the backup ring 51 should preferably be determined taking into account the amount of elastic deformation which occurs when the backup ring 51 is forced against the middle portions 22b of the magnet mounting members 22 which are arranged in a ring form having a specific diameter. In this structure, it is possible to apply an outwardly directed pushing force to the middle portions 22b of the magnet mounting members 22 by fitting the backup ring 51, whereby the magnet assemblies 20 can be more firmly affixed to the claw-shaped magnetic poles 14a, 15a.

Fourth Embodiment

Figure 8A:
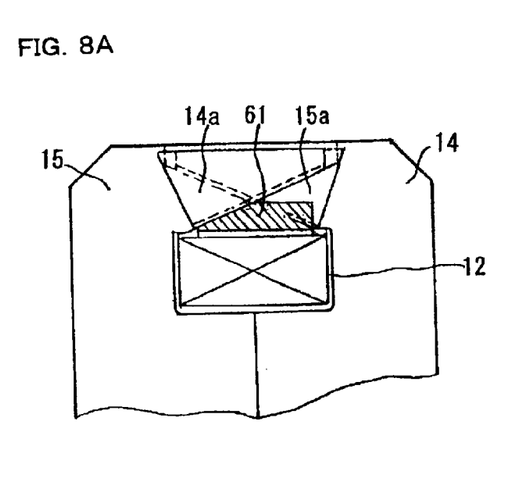
FIG. 8A is a sectional view showing how a backup ring having on its outside multiple slant surfaces alternately located on left and right sides is fitted on the inside of inclined surfaces of magnet mounting members of individual magnet assemblies according to a fourth embodiment.
Figure 8B:
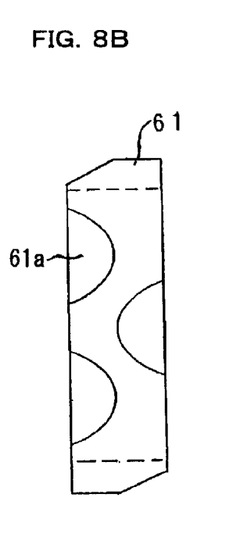
FIG. 8B is a side view of the backup ring of the fourth embodiment.

FIG. 8A is a sectional view of a pole core portion assembled by using a backup ring 61 according to a fourth embodiment of the invention, and FIG. 8B is a side view of the backup ring 61, in which elements identical or similar to those of the first embodiment are designated by the same reference numerals.

Produced by shaping a hollow cylindrical piece, the backup ring 61 of this embodiment has on its outside multiple slant surfaces 61a alternately located on left and right sides (FIG. 8B). The backup ring 61 thus shaped is fitted inside the magnet mounting members 22 mounted on the claw-shaped magnetic poles 14a, 15a such that the slant surfaces 61a of the backup ring 61 align with the inclined inside surfaces of the magnet assemblies 20.

In this embodiment, the backup ring 61 is produced by shaping a hollow cylindrical piece in such a fashion that the slant surfaces 61a alternately located on the left and right sides align with the inclined inside surfaces of the magnet assemblies 20 alternately mounted on the claw-shaped magnetic poles 14a, 15a of the front and rear pole core members 14, 15. After fitting the individual magnet assemblies 20 on the claw-shaped magnetic poles 14a, 15a, the backup ring 61 thus shaped is fitted inside the claw-shaped magnetic poles 14a, 15a of the pole core members 14, 15 such that the slant surfaces 61a the backup ring 61 are situated against the middle portions 22b of the individual magnet mounting members 22. Then, the front and rear pole core members 14, 15 are mounted on the rotary shaft 11 so that the front and rear pole core members 14, 15 are engaged with one another.

The backup ring 61 of this embodiment has an advantage that it can be produced by shaping a hollow cylindrical piece by an automated machining process.

The outside diameter of the backup ring 61 should preferably be determined taking into account the amount of elastic deformation which occurs when the backup ring 61 is forced against the middle portions 22b of the magnet mounting members 22 which are arranged in a ring form having a specific diameter. In this structure, it is possible to apply an outwardly directed pushing force to the middle portions 22b of the magnet mounting members 22 by fitting the backup ring 61, whereby the magnet assemblies 20 can be more firmly affixed to the claw-shaped magnetic poles 14a, 15a.

Fifth Embodiment

A fifth embodiment is one form of the invention applicable to any of the foregoing first to fourth embodiments. Specifically, the rotor 10 of one of the first to fourth embodiments in which the backup ring 31, 41, 51 or 61 is fitted inside the inclined inside surfaces formed by the middle portions 22b of the magnet mounting members 22 of the magnet assemblies 20 mounted on the individual claw-shaped magnetic poles 14a, 15a of the front and rear pole core members 14, 15 is impregnated with resin upon completion of rotor assembly.

If the rotor 10 is impregnated with resin after assembly, the resin seeps into gaps between the magnet assemblies 20 and the claw-shaped magnetic poles 14*a*, 15*a* and into gaps between the magnets 21 and the claw-shaped magnetic poles 14*a*, 15*a*, filling up these gaps and affixing the individual elements even more securely.

If the rotor 10 is resin-impregnated in this fashion, the magnet assemblies 20 are affixed to the individual claw-shaped magnetic poles 14*a*, 15*a* so securely that flutter of the magnet mounting members 22 and the magnets 21 potentially occurring when the rotor 10 rotates is effectively suppressed. This construction makes it possible to produce a high-quality rotor of which vibrations and acoustic noise are well suppressed.

What is claimed is:

1. A rotor of a rotating electric machine, said rotor comprising:

a rotary shaft;

a rotor coil surrounding the rotary shaft;

a pair of pole core members having a plurality of claw-shaped magnetic poles extending along an axial direction of the rotor at regular intervals around the rotor, each of the claw-shaped magnetic poles becoming thinner toward an extreme end thereof forming an inclined inside surface facing the rotary shaft, and the pole core members being fitted on the rotary shaft with the claw-shaped magnetic poles thereof interdigitated with one another so that the claw-shaped magnetic poles surround the rotor coil;

magnets located on either side of each of the claw-shaped magnetic poles such that each of the magnets produces a magnetic field oriented in a direction opposite to the direction of a magnetic flux formed between the adjacent claw-shaped magnetic poles;

magnet mounting members for holding the magnets against said side surfaces of each of the claw-shaped magnetic poles, each of the magnet mounting members having a generally C-shaped cross section including:

magnet retaining portions formed on either side for holding the magnets against the side surfaces of each of the claw-shaped magnetic poles; and a middle portion having a platelike shape which matches the inclined inside surface of each of the claw-shaped magnetic poles, each of the magnet mounting members and the magnets fitted in the magnet retaining portions on both sides together forming a magnet assembly; and a backup ring having an outer peripheral surface for securing the magnet mounting members in position;

wherein each of the claw-shaped magnetic poles has a stopper portion at the extreme end of the inclined inside surface, the magnet assembly is fixedly mounted on each of the claw-shaped magnetic poles with the middle portion of the magnet mounting member placed against the inclined inside surface of each of the claw-shaped magnetic poles and engaged with the stopper portion thereof, the outer peripheral surface of the backup ring is shaped to align with alternately oppositely inclined inside surfaces of the magnet mounting members of the magnet assemblies mounted on the claw-shaped magnetic poles at basal parts thereof, and the backup ring is fitted inside the magnet assemblies mounted on the claw-shaped magnetic poles such that the backup ring aligns with the inclined inside surfaces of the magnet mounting members.

2. The rotor of the rotating electric machine according to claim 1, wherein the backup ring has on the outside thereof an outwardly projecting V-shaped cross section which aligns with the inclined inside surfaces of the magnet mounting members of the magnet assemblies.

3. The rotor of the rotating electric machine according to claim 1, wherein the backup ring is formed of a pair of umbrella-shaped ring pieces of which outer surfaces together constitute the outer peripheral surface of the backup ring which aligns with the inclined inside surfaces of the magnet mounting members of the magnet assemblies.

4. The rotor of the rotating electric machine according to claim 1, wherein the backup ring comprises a hollow cylindrical piece having a curved outer surface forming an outwardly projecting V-shaped cross section which aligns with the inclined inside surfaces of the magnet mounting members of the magnet assemblies.

5. The rotor of the rotating electric machine according to claim 1, wherein the backup ring comprises a hollow cylindrical piece having slant surfaces alternately located on left and right sides of the outside of the hollow cylindrical piece, the slant surfaces of the backup ring aligning with the inclined inside surfaces of the oppositely inclined alternate inside surfaces of the magnet mounting members of the magnet assemblies.

6. The rotor of the rotating electric machine according to claim 1, wherein an outside diameter of the backup ring is determined taking into account an amount of elastic deformation of the outer peripheral surface of the backup ring which occurs when the backup ring is forced against the inclined inside surfaces of the magnet mounting members of the magnet assemblies.

7. The rotor of the rotating electric machine according to claim 1, wherein an entirety of the rotor is impregnated with resin upon completion of rotor assembly.

\* \* \* \* \*